Aug. 4, 1964
S. B. SMITH
3,143,665
SILICON CONTROL RECTIFIER SWITCHING
CIRCUIT HAVING VARIABLE DELAY
Filed April 2, 1962
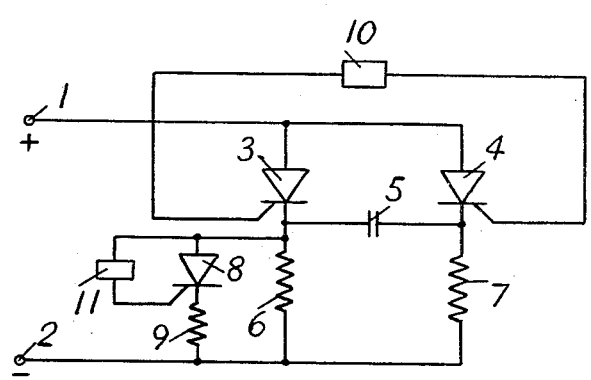

United States Patent Office  
3,143,665  
Patented Aug. 4, 1964

3,143,665  
SILICON CONTROL RECTIFIER SWITCHING CIRCUIT HAVING VARIABLE DELAY  
Sidney Basil Smith, Hemel Hempstead, England, assignor to Rotax Limited, London, England  
Filed Apr. 2, 1962, Ser. No. 184,314  
Claims priority, application Great Britain Apr. 17, 1961  
1 Claim. (Cl. 307—88.5)

This invention relates to circuits employing controlled rectifiers, and of the kind including first and second terminals which in use are of relatively positive and negative polarity respectively, first and second controlled rectifiers having their anodes connected to the first terminal and their cathodes connected to the second terminal, first and second loads in series with the first and second controlled rectifiers respectively and a capacitor connected between a point intermediate the first control rectifier and first load, and a point intermediate the second control rectifier and second load.

Such circuits are bi-stable, successive firings of the first and second controlled rectifiers serving to cause current to flow through the first and second loads respectively, and in addition serving to cut off the previously conducting controlled rectifier by virtue of the voltage developed across the capacitor. It will be appreciated that by varying the relative times for which the controlled rectifiers are conductive the circuit may be used, as for example, a voltage regulator. Thus, the first load may be a field winding of a generator, and the output from the generator can be controlled by controlling the time for which the first controlled rectifier is conductive. However, the minimum period for which current can flow through the first load is limited, since the first controlled rectifier must be conductive for a period determined by the time taken for the capacitor to become charged to a predetermined voltage sufficient to switch off a conducting rectifier when the other rectifier is fired. The object of the present invention is to provide a circuit of the kind specified in a convenient form whereby this disadvantage is overcome.

According to the invention, a circuit of the kind specified includes a third controlled rectifier and a third load connected across the first load, and means operable by current flowing through the first controlled rectifier for firing the third controlled rectifier after a variable delay.

The accompanying drawing is a circuit diagram illustrating one example of the invention.

Referring to the drawing, there are provided first and second terminals 1, 2 which are adapted for connection to a source of direct or rectified alternating current so as to be of positive and negative polarity in use respectively. Connected to the terminal 1 are the anodes of first and second controlled rectifiers 3, 4 having their cathodes interconnected through a capacitor 5, the cathodes being further connected to the terminal 2 through first and second loads 6, 7 respectively. Further, the cathode of the controlled rectifier 3 is connected to the terminal 2 through the anode and cathode of a third controlled rectifier 8 and a third load 9 in series therewith.

The controlled rectifiers are fired alternately at a constant frequency by any convenient means such, for example, as a multivibrator circuit 10, and the arrangement is such that the periods of conduction of these rectifiers are always long enough for the capacitor to be charged to a predetermined voltage sufficient to switch off a conducting rectifier when the other rectifier is fired. Conveniently, the capacitor is always allowed to charge to the supply voltage. The controlled rectifier 8 is fired by means 11 operable by current flowing through the controlled rectifier 3 only after a delay which is variable. The means 11 may conveniently be a pulse generator of variable mark-space ratio.

In operation, assuming that the controlled rectifier 4 is conducting, then the capacitor 5 will be charged to the supply voltage. Firing of the controlled rectifier 3 will cause current to flow through the load 6 whilst the voltage across the capacitor 5 will ensure that the controlled rectifier 4 is cut off. After a predetermined delay the controlled rectifier 8 will be fired so that current flows in the load 9. Re-firing of the controlled rectifier 4 causes the controlled rectifier 3 to be cut off, and since current flow to the controlled rectifier 8 is through the controlled rectifier 3 the controlled rectifier 8 will also be cut off. Hence, it will be appreciated that the time for which current flows in the load 9 can be varied between zero and a maximum which is equal to the period of conduction of the controlled rectifier 3, so that if the load 9 is a field winding of a generator, complete control of the output voltage of the generator can be obtained. However, the capacitor 5 is always charged for the full period of conduction of the rectifier 3, 4 so that it is always charged to the supply voltage and so will switch off one of the rectifiers when the other is fired.

If desired, the loads may be connected in the anode circuits of the controlled rectifiers, in which case the capacitor is connected between the anodes.

Having thus described my invention what I claim as new and desire to secure by Letters Patent is:

A circuit employing controlled rectifiers, including first and second terminals which in use are of relatively positive and negative polarity respectively, first and second controlled rectifiers having their anodes connected to the first terminal and their cathodes connected to the second terminal, first and second loads in the anode-cathode paths of the first and second controlled rectifiers respectively, a capacitor one side of which is connected to a point intermediate the first controlled rectifier and first load, and the other side of which is connected to a point intermediate the second controlled rectifier and second load, means for firing said controlled rectifiers in turn, said capacitor discharging on firing of a controlled rectifier to switch off the previously conducting controlled rectifier, a third controlled rectifier and a third load connected across the first load in series, said third controlled rectifier being switched off when the first controlled rectifier is switched off, and means operable by current flowing through the first controlled rectifier for firing the third controlled rectifier after a delay which is variable between extreme values in one of which no current flows through the third load whilst the first controlled rectifier is conducting and in the other of which current flows through the third load throughout the period when the first controlled rectifier is conducting.

References Cited in the file of this patent  
UNITED STATES PATENTS  
3,015,739   Manteuffel _____ Jan. 2, 1962  
3,097,335   Schmidt _____ July 9, 1963

OTHER REFERENCES  
Blake: Electronics, vol. 33, No. 22, May 27, 1960, pages 114–117, "Designing Solid-State Power Relays."